(12) United States Patent
Cory et al.

(10) Patent No.: US 12,175,908 B1
(45) Date of Patent: Dec. 24, 2024

(54) DIGITAL WINDOW STICKER (71) Applicant: GM Global Technology Operations LLC, Detroit, MI (US)

(72) Inventors: Danielle A. Cory, Brighton, MI (US); Joseph F. Szczerba, Grand Blanc, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/511,516

(22) Filed: Nov. 16, 2023

(51) Int. Cl.
*G09G 3/20* (2006.01)
*G06F 3/01* (2006.01)

(52) U.S. Cl.
CPC ............... *G09G 3/20* (2013.01); *G06F 3/011* (2013.01); *G09G 2354/00* (2013.01); *G09G 2380/10* (2013.01)

(58) Field of Classification Search
CPC .. G09G 3/20; G09G 2354/00; G09G 2380/10; G06F 3/011
See application file for complete search history.

(56) References Cited

U.S. PATENT DOCUMENTS

| | | | |
|---|---|---|---|
| 2012/0089273 A1* | 4/2012 | Seder | B60Q 1/5035 701/2 |
| 2018/0075656 A1* | 3/2018 | Kim | G06T 19/006 |
| 2018/0166047 A1* | 6/2018 | Yamazato | G02B 27/0101 |

* cited by examiner

*Primary Examiner* — Brent D Castiaux
(74) *Attorney, Agent, or Firm* — Vivacqua Crane, PLLC (57) ABSTRACT

A system for displaying a digital window sticker within a vehicle includes a system controller adapted to select a digital image to be displayed, determine a location for the selected digital image to be displayed, and display, via a display within the vehicle, the selected digital image.

20 Claims, 4 Drawing Sheets

DIGITAL WINDOW STICKER

INTRODUCTION

The present disclosure relates to a system and method for displaying a digital image on a window surface of a vehicle. It is a popular practice for users of a vehicle to display stickers on the windows of the vehicle visible to others outside the vehicle. Such stickers may display a user's support of a favorite sports team or brand, or other message or illustration that a user wishes to display. Other stickers may include identification or authorization information, such as a parking pass or state park entrance pass.

Unfortunately, such stickers are relatively permanent, and cannot be changed easily, and stickers on a vehicle may not be desirable or appropriate for all users of the vehicle. Thus, while current window stickers achieve their intended purpose, there is a need for a new and improved system and method for displaying digital images or digital window stickers that can be customized for or by the user and may be readily changed for different circumstances and users.

SUMMARY

According to several aspects of the present disclosure, a method of displaying a digital window sticker within a vehicle includes selecting, with a system controller, a digital image to be displayed, determining, with the system controller, a location within a window surface of the vehicle for the selected digital image to be displayed, and displaying, with the system controller, via a display within the vehicle, the selected digital image from a window surface of the vehicle.

According to another aspect, the selecting, with a system controller, a digital image to be displayed further includes one of selection of the digital image from a personal library of digital images available to a user, or selection of the digital image from available digital images obtainable from an application based online store.

According to another aspect, the selecting a digital image to be displayed further includes receiving, with the system controller, via a human machine interface (HMI) in communication with the system controller, selection, by a user within the vehicle, of a digital image to be displayed.

According to another aspect, the selecting a digital image to be displayed further includes receiving, with the system controller, from a plurality of sensors within the vehicle and in communication with the system controller, contextual data related to the vehicle, receiving, with the system controller, via a human machine interface in communication with the system controller, user preferences related to when and where digital images are displayed, identifying, with an occupant monitoring system in communication with the system controller and facial recognition algorithms, a user within the vehicle; selecting, with the system controller, a digital image to be displayed based on a machine learning model in communication with a database including data related to past occurrences of the system displaying digital images, the identity of the user within the vehicle and preferences received for the user, and real time contextual data for the vehicle received from the plurality of sensors.

According to another aspect, the selecting, with the system controller, a digital image to be displayed further includes one of searching, with the system controller, the personal library of digital images available to the user, and prompting the user, via the HMI, with a suggested digital image from the personal library of digital images available to the user, or searching, with the system controller, the application based online store, identifying a digital image available for purchase through the application based online store, and prompting the user, via the HMI, with an option to purchase and display the identified digital image.

According to another aspect, the determining, with the system controller, a location for the selected digital image to be displayed further includes, when the selected digital image includes identification and authorization information, selecting a location within a bottom corner region of a front windshield of the vehicle, and, when the selected digital image does not include identification and authorization information, selecting a location within at least one of a bottom corner region of a rear window of the vehicle, and a region within any window surface of the vehicle selected by the user.

According to another aspect, the displaying, with the system controller, via a display within the vehicle, the selected digital image further includes, when the selected digital image includes identification and authorization information, displaying the selected digital image within a bottom corner region of a front windshield of the vehicle, and, when the selected digital image does not include identification and authorization information, displaying the selected digital image within a bottom corner region of a rear window of the vehicle.

According to another aspect, the determining, with the system controller, a location for the selected digital image to be displayed further includes, when at least one digital image is currently being displayed, prompting the user to verify that the user wishes to replace one of the at least one currently displayed digital images with the selected digital image, receiving, via the HMI, confirmation that the user wishes to replace one of the at least one currently displayed digital images with the selected digital image, and selection of one of the at least one currently displayed digital images to be replaced by the selected digital image.

According to another aspect, the method further includes, when at least one digital image is currently being displayed and after displaying the selected digital image, prompting the user to select any of the at least one digital images currently being displayed to be removed, receiving input, via the HMI, from the user selecting currently displayed digital images to be removed, removing selected currently displayed digital images from the display.

According to another aspect, the displaying, with the system controller, via the display within the vehicle, the selected digital image further includes displaying, with the system controller, the selected digital image on a display adapted to present the digital image outward from a window surface within the vehicle.

According to several aspects of the present disclosure, a system for displaying a digital window sticker within a vehicle includes a system controller adapted to select a digital image to be displayed, determine a location within a window surface of the vehicle for the selected digital image to be displayed, and display, via a display within the vehicle, the selected digital image from a window surface of the vehicle.

According to another aspect, the system controller is adapted to one of select the digital image from a personal library of digital images available to a user, or select the digital image from available digital images obtainable from an application based online store.

According to another aspect, when selecting a digital image to be displayed, the system controller is further adapted to receive, via a human machine interface (HMI) in communication with the system controller, selection, by the user within the vehicle, of a digital image to be displayed.

According to another aspect, when selecting a digital image to be displayed, the system controller is further adapted to receive, from a plurality of sensors within the vehicle and in communication with the system controller, contextual data related to the vehicle, receive, via a human machine interface (HMI) in communication with the system controller, user preferences related to when and where digital images are displayed, identify, with an occupant monitoring system in communication with the system controller and facial recognition algorithms, the user within the vehicle, and select a digital image to be displayed based on a machine learning model in communication with a database including data related to past occurrences of the system displaying digital images, the identity of the user within the vehicle and preferences received for the user, and real time contextual data for the vehicle received from the plurality of sensors.

According to another aspect, when selecting a digital image to be displayed, the system controller is further adapted to one of search the personal library of digital images available to the user, and prompt the user, via the HMI, with a suggested digital image from the personal library of digital images available to the user, or search the application based online store, identify a digital image available for purchase through the application based online store, and prompt the user, via the HMI, with an option to purchase and display the identified digital image.

According to another aspect, when determining a location for the selected digital image to be displayed, the system controller is further adapted to select a location within a bottom corner region of a front windshield of the vehicle when the selected digital image includes identification and authorization information, and select a location within a bottom corner region of a rear window of the vehicle when the selected digital image does not include identification and authorization information, and when displaying, via the display within the vehicle, the selected digital image, the system controller is further adapted to display the selected digital image within a bottom corner region of a front windshield of the vehicle when the selected digital image includes identification and authorization information, and display the selected digital image within a bottom corner region of a rear window of the vehicle when the selected digital image does not include identification and authorization information.

According to another aspect, when determining a location for the selected digital image to be displayed, the system controller is further adapted to, when at least one digital image is currently being displayed, prompt the user to verify that the user wishes to replace one of the at least one currently displayed digital images with the selected digital image, and receive, via the HMI, confirmation that the user wishes to replace one of the at least one currently displayed digital images with the selected digital image, and selection of one of the at least one currently displayed digital images to be replaced by the selected digital image.

According to another aspect, when at least one digital image is currently being displayed and after displaying the selected digital image, the system controller is further adapted to prompt the user to select any of the at least one digital images currently being displayed to be removed, receive input, via the HMI, from the user selecting currently displayed digital images to be removed, remove selected currently displayed digital images from the display.

According to another aspect, the display is adapted to present the selected digital image outward from a window surface within the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 1:
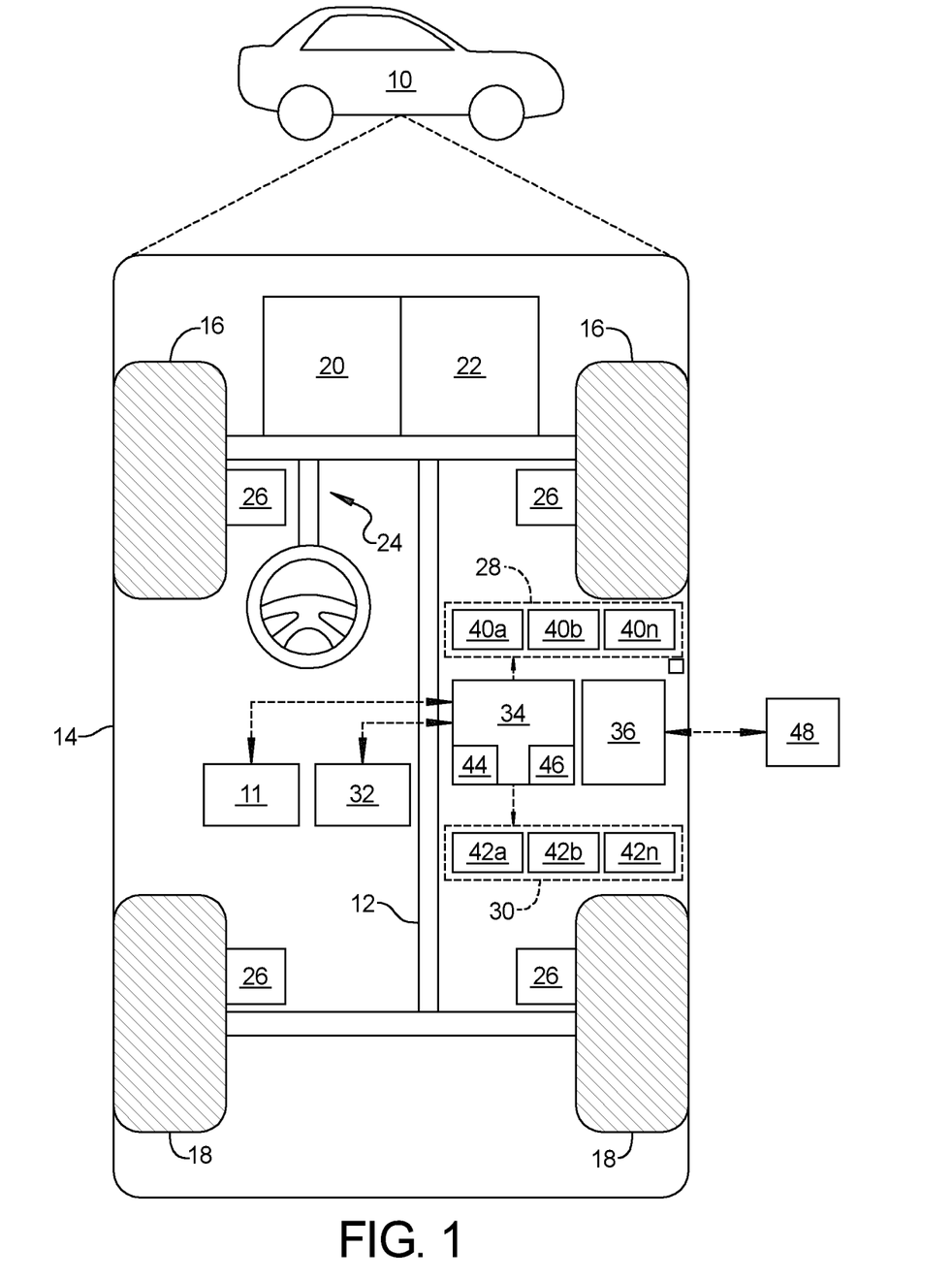
FIG. 1 is a schematic diagram of a vehicle having a system for displaying digital images or digital window stickers that can be customized for or by the user and may be readily changed for different circumstances and users according to an exemplary embodiment.

In accordance with an exemplary embodiment, FIG. 1 shows a vehicle 10 with an associated system 11 for displaying digital images on a window surface of the vehicle 10. In general, the system 11 works in conjunction with other systems within the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
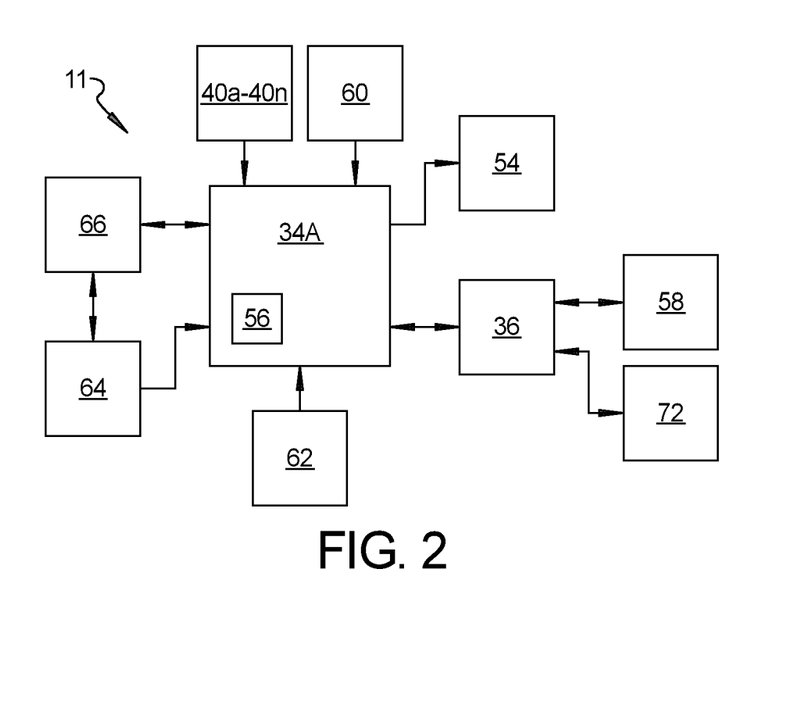
FIG. 2 is a schematic diagram of the system according to an exemplary embodiment.

Referring to FIG. 2 a schematic diagram of the system 11 is shown. The system 11 includes a system controller 34A in communication with the plurality of sensing devices (on-board sensors) 40a-40n. The system controller 34A may be the vehicle controller 34, or the system controller 34A may be a separate controller in communication with the vehicle controller 34. The system controller 34A is adapted to select a digital image 50 to be displayed on a window surface (front windshield 52A, rear window 52B) of the vehicle 10, determine a location for the selected digital image 50 to be displayed, and to display the selected digital image 50 on a display 54 that is adapted to present the selected digital image 50 outward from a window surface 52 within the vehicle 10.

Figure 3:
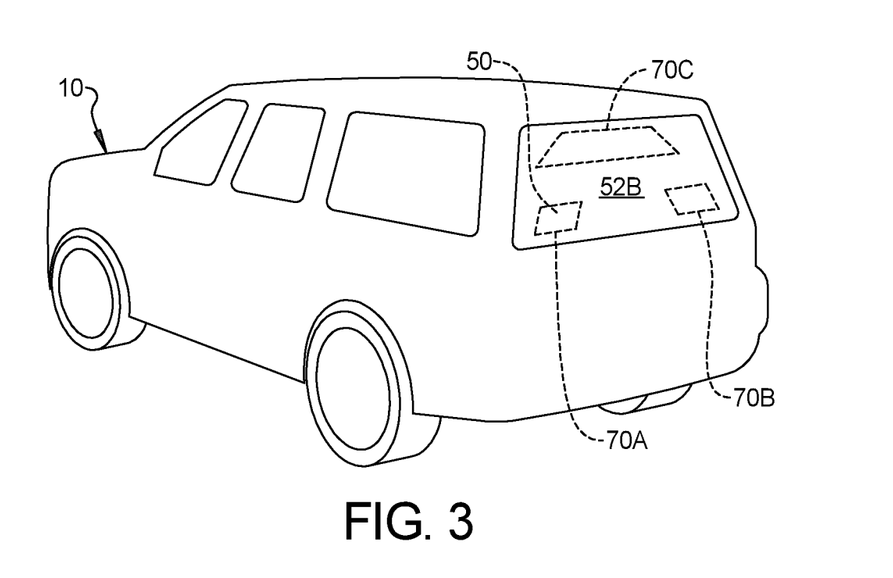
FIG. 3 is a schematic view of a vehicle with a digital image displayed in a lower left region of a rear window.
Figure 4:
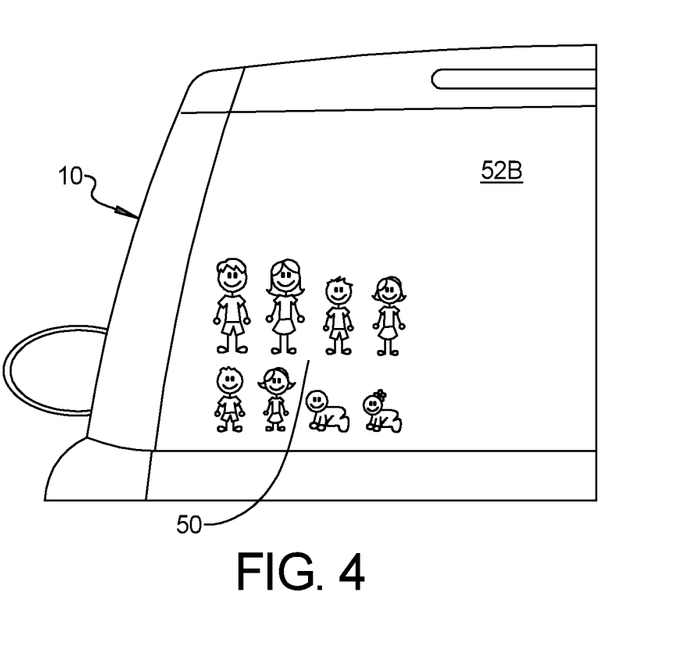
FIG. 4 is an enlarged view of a portion of FIG. 3, as indicated by the area within FIG. 3 labelled "FIG. 4"
Figure 5:
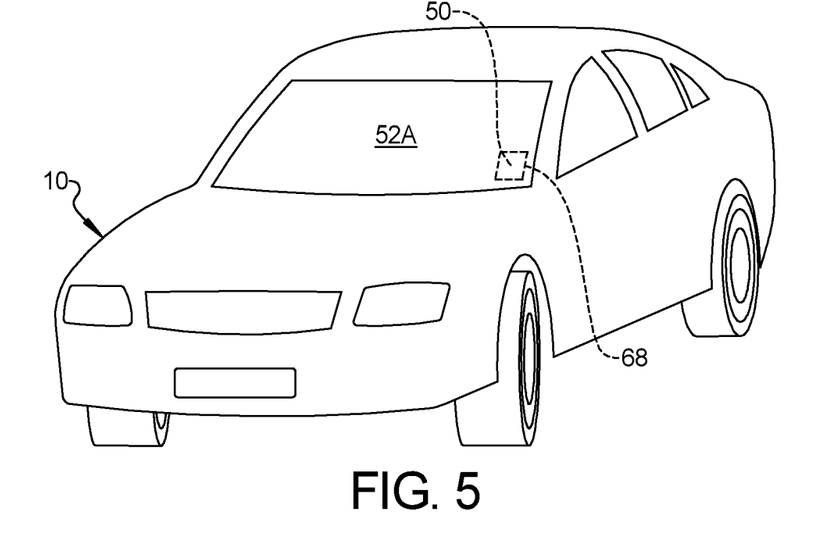
FIG. 5 is a schematic view of a vehicle with a digital image displayed in a lower corner region of a front windshield.

Referring to FIG. 3 and FIG. 4, it is a popular practice for users of a vehicle 10 to display stickers on the windows of the vehicle 10 visible to others outside the vehicle 10. The system 11 is adapted to display a digital image 50, projected outward from a window surface 52A, 52B of the vehicle 10, and which can be customized for or by the user and may be readily changed for different circumstances and users. As shown FIG. 3 and FIG. 4, the digital image 50 is of members of the user's family. The digital image 50 may be any image desired by a user. By way of non-limiting examples, the digital image 50 may be a logo for a professional or college sports team, a meme, a logo for the brand or type of vehicle, or an image representing a user's interest in a particular hobby or activity. Referring to FIG. 5, the digital image 50 may also be a badge or pass containing identity information or authorization for entry into a facility or location. For example, the digital image 50 may be a state park pass that authorizes the vehicle 10 to enter state parks, or a parking pass which authorizes the vehicle 10 to be parked at a specific parking lot.

The display 54 is adapted to present the digital image 50 outward from a window surface 52A, 52B within the vehicle 10 for viewing from outside of the vehicle 10. The display 54 may be any suitable display adapted to present a digital image 50 on or within a window surface 52A, 52B while maintaining overall transparency of the window surface 52A, 52B. By way of non-limiting examples, the display 54 may include a micro light emitting diode system, a transparent organic light emitting diode system or an electroluminescent transparent display mounted within or onto a window surface 52A, 52B within the vehicle 10 to illuminate a digital image 50 projected outward from the window surface 52A, 52B. The display 54 may also include a traditional display screen mounted onto or behind a window surface 52A, 52B within the vehicle 10.

The display 54 may use any suitable transparent display technology to display information onto a window surface 52A, 52B of the vehicle 10 to be viewed by third-party entities outside the vehicle 10. In an exemplary embodiment, the display 54 uses excitation light projected onto the window surface 52A, 52B to illuminate transparent phosphors embedded within a substrate on the window surface 52A, 52B. The transparent phosphors are light emitting particles which fluoresce in response to being excited by the excitation light. This type of display 54 is discussed in greater detail in U.S. application Ser. No. 17/749,464 titled "HYBRID AUGMENTED REALITY HEAD-UP DISPLAY FOR CREATING AN EDGE-TO-EDGE AUG- MENTED REALITY VIEW" filed on May 20, 2022, the entire contents of which is hereby incorporated by reference.

In another exemplary embodiment, the display 54 is an E-ink display. E-ink displays, also known as "electronic ink" or "electronic paper," are known for low power consumption and visual similarity to ink on paper. Unlike traditional displays which often comprise individual pixels that each display a color, E-ink displays rely on chemistry. E-ink displays are made of a thin film on top of millions of small micro-capsules filled with particles floating in a clear fluid. These particles are all colored a specific pigment. In greyscale displays, those pigments will be either black or white. These particles are set to move around depending on what type of electric charge they receive. For example, black will rise when exposed to a negative charge, and white will rise when exposed to a positive charge. Therefore, an E-ink display works by sending these small electric signals to all of these capsules. If a particular spot is supposed to be black, then the device will send a negative charge to move black to the top. That is the reason why E-ink displays use such little power. Unlike an LED display, which uses colored light that is on at all times, E-ink displays only consume power when the arrangement of colors on the display needs to change. The display takes up virtually no power when a stagnant digital image 50 is being displayed.

The system controller 34A is adapted to either select the digital image 50 from a personal library 56 of digital images available to a user, or, select the digital image 50 from available digital images obtainable from an application based online store 58. In an exemplary embodiment, when selecting a digital image 50 to be displayed, the system controller 34A is further adapted to receive, via a human machine interface (HMI) 60 in communication with the system controller 34A, selection, by the user within the vehicle 10, of a digital image 50 to be displayed.

The system controller 34A includes a personal library 56 of digital images that have been previously purchased and uploaded by a user. When the user wishes to display a digital image 50, the user searches, via the HMI 60, the personal library 56 of digital images to see if an image that the user wishes to display is present within the user's personal library 56. If the user finds an image within the personal library 56, the user selects, via the HMI 60, the digital image 50 for display. If the user's personal library 56 does not include a digital image 50 suitable for the user, the user can access, via the HMI 60 and the wireless communication module 36, or through a mobile device in communication with the system controller 34A, a remote application or provider 58 from which the user may purchase digital images that can be displayed and downloaded to the user's personal library 56 for future use.

In another exemplary embodiment, when selecting a digital image 50 to be displayed, the system controller 34A is further adapted to receive, from the plurality of sensors 40a-40n within the vehicle 10 and in communication with the system controller 34A, contextual data related to the vehicle 10. Contextual data includes information related to the location of the vehicle 10, weather conditions (temperature, precipitation, date, time of day), speed, acceleration, data collected by cameras and analyzed with computer vision algorithms, etc. The system controller 34A is further adapted to receive, via the HMI 60 in communication with the system controller 34A, user preferences related to when and where digital images 50 are displayed.

The user may currently or in the past enter preferences for how and when they wish to have specific digital images 50 displayed. For example, a user may enter preferences that include displaying a digital image 50 with a logo and message "Baby On Board" whenever they are traveling with an infant child. Thus, whenever the system controller 34A, using the plurality of sensors 40a-40n within the vehicle 10 and an occupant monitoring system 62 determines that an infant child is present within the vehicle 10, the system controller 34A will display the "Baby On Board" digital image 50. In another example, a user may wish to have a state park entrance permit displayed on the front windshield 52A only when needed to enter a state park. Thus, the system controller 34A will only display a digital image 50 including the state park entrance permit when the system controller 34A determines that the vehicle 10 is at an entrance to a state park.

The system controller 34A uses the occupant monitoring system 62 in communication with the system controller 34A and facial recognition algorithms to identify the user and other passengers (such as infant children) within the vehicle 10 in order to determine what preferences to apply. The system controller 34A selects a digital image 50 to be displayed based on a machine learning model 64 in communication with a database 66 including data related to past occurrences of the system 11 displaying digital images 50, the identity of the user within the vehicle 10 and preferences received for the user, and real time contextual data for the vehicle 10 received from the plurality of sensors 40a-40n.

The machine learning model 64 uses past instances of the vehicle 10 displaying digital images 50 to bolster real-time data collected by the plurality of sensors 40a-40n and to probabilistically predict a digital image 50 that will be desired by the user. The machine learning model 64, based on past occurrences, is taught to recognize real time contextual circumstances (identity of the user, vehicle contextual data, date, time of day, location, etc.) allowing the system controller 34A and machine learning model 64 to accurately predict a digital image 50 desired by the user. Each time the system 11 displays a digital image 50, the system controller 34A updates the machine learning model 64 with contextual data to continuously improve the accuracy of the machine learning model 64.

Various techniques are employed to extract meaningful features from sensor readings and data, including time-series analysis, frequency-domain analysis, and spatial-temporal patterns. The machine learning model 64 may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN). The machine learning model 64 is trained with data collected from a plurality of different vehicles and users. A diverse dataset is collected from vehicles equipped with sensors such as GPS, accelerometers, cameras, radar, and LIDAR. The data encompasses various driving scenarios, including urban, highway, and off-road driving. Before feeding the data into the machine learning model 64, preprocessing steps are undertaken to remove noise, handle missing values, and standardize features.

An essential step is the extraction of relevant features from the raw data. As mentioned above, various techniques are employed to extract meaningful features from sensor readings, including time-series analysis, frequency-domain analysis, and spatial-temporal patterns. Different types of machine learning algorithms may be used for predicting digital images 50 that may be desired by a user. The machine learning model 64 is trained on a labeled dataset and evaluated using various performance metrics such as accuracy, precision, recall, F1-score, and confusion matrix. The hyperparameters of the models are tuned to achieve optimal results. The machine learning model 64 is further trained on training data and will learn to map input features to the corresponding probabilities.

Real-time data from occurrences of the system 11 displaying digital images 50 are saved to the remote database 66 and used to continuously update the machine learning model 64. Thus, the system controller 34A uses the machine learning model 64 and machine learning techniques to more accurately predict digital images 50 that may be desired by a user based on analyzing the real-time data collected and data from past occurrences from the remote database 66.

The system controller 34A includes a personal library 56 of digital images 50 that have been previously purchased and uploaded by a user. The system controller 34A searches the personal library 56 of digital images 50 to see if an image that the system controller 34A has predicted will be desired by the user is present within the user's personal library 56. If the system controller 34A finds an image within the personal library 56, the system controller 34A prompts the user, via the HMI 60, to see if the user wishes to display the digital image 50 suggested by the system controller 34A. If the user's personal library 56 does not include a digital image 50 that corresponds to the predictions of the system controller 34A and machine learning model 64, the system controller 34A can access, via the wireless communication module 36, a remote application or provider 58 from which the user may purchase digital images 50 that can be displayed and downloaded to the user's personal library 56 for future use. When the system controller 34A identifies a digital image 50 available from such application 58, the system controller 34A prompts, via the HMI 60, the user with the option to purchase the digital image 50 from the application 58 and display the digital image 50.

For example, a user is traveling within the vehicle 10 to a football game. The system controller 34A receives data from vehicle systems (navigation, GPS), onboard sensors 40a-40n, and other remote data sources (game schedules) to determine that the vehicle 10 is traveling to the football game. Using machine learning techniques the system controller 34A determines a high probability that the user may desire to display a digital image 50 of the logo of the home team for the football game on the rear window 52B of the vehicle 10. This determination may be based on, for instance, past occurrences where the user displayed a digital image 50 including a logo for the local baseball team when traveling to baseball games. Thus, the system controller 34A, using the machine learning model 64 and machine learning techniques, predicts that the user would want to display a digital image 50 of the logo of the home football team at this time.

The system controller 34A will search the user's personal library 56 to see if a logo for the home football team is present, and if so, will prompt the user to confirm that the user wishes to display the digital image 50 of the logo for the home football team. If no such digital image 50 is available within the user's personal library 56, the system controller 34A will access remote providers 58, identify a suitable digital image 50, and prompt the user, via the HMI 60, to confirm that the user wishes to purchase and display the digital image 50.

In another example, the system controller 34A, using the occupant monitoring system 62, identifies the user as a new driver or a teen driver and automatically, based on preferences entered by an adult user, displays a digital image 50 indicating "New Driver" to alert other drivers in vicinity of the vehicle 10.

When determining a location for the selected digital image 50 to be displayed, the system controller 34A is further adapted to select a location within a bottom corner region 68 of a front windshield 52A of the vehicle 10 when the selected digital image 50 includes identification and authorization information and display the selected digital image 50 within the bottom corner region 68 of the front windshield 52A. For example, referring to FIG. 5 and FIG. 6, if the selected digital image 50 is a parking pass which authorizes a vehicle 10 to enter and park at a parking lot or parking ramp, the system controller 34A selects a location within the bottom corner region 68 of the front windshield 52A to display the digital image 50, where the digital image 50 can be seen and read by an individual, such as a parking attendant, or alternatively, the digital image 50 can be scanned by a camera at an entrance to the parking lot or parking ramp.

When determining a location for the selected digital image 50 to be displayed, the system controller 34A is further adapted to select a location within a bottom corner region 70A, 70B, 70C of a rear window 52B of the vehicle 10 when the selected digital image 50 does not include identification and authorization information and display the digital image 50 within the bottom corner region 70A, 70B of the rear window 52B of the vehicle 10. For example, referring to FIG. 4, when the digital image 50 is a logo for the user's favorite sports team, the digital image 50 is displayed at one of either the left lower corner region 70A of the rear window 52B or the right lower corner region 70B of the rear window 52B. Alternatively, the digital image 50 may be displayed in a central region 70C of the rear window 52B. The final position for the displayed digital image 50 depends on pre-entered preferences of the user and data from past occurrences as determined by the system controller 34A and machine learning techniques, as well as real-time input from the user with preferences for displaying the digital image 50. It should be understood by those skilled in the art that the system 11 may be used to display digital images 50 outward from any window surface within the vehicle 10 without departing from the scope of the present disclosure.

In an exemplary embodiment, when determining a location for the selected digital image 50 to be displayed, the system controller 34A is further adapted to determine if there is already at least one digital image 50 being displayed at the determined location. When at least one digital image 50 is currently being displayed, the system controller 34A prompts the user to verify that the user wishes to replace one of the at least one currently displayed digital images 50 with the selected digital image 50. The system controller 34A receives, via the HMI 60, confirmation that the user wishes to replace one of the at least one currently displayed digital images 50 with the selected digital image 50, and selection, by the user, of one of the at least one currently displayed digital images 50 to be replaced by the selected digital image 50.

For example, when a user is driving the vehicle 10 to a football game, and the user desires to display a logo for the local football team, the system controller 34A determines that the digital image 50 of the logo for the local football team should be displayed in the lower left corner region 70A of the rear window 52B of the vehicle 10, however, the user generally has a digital image 50 depicting members of the user's family, as shown in FIG. 4, and that digital image 50 is currently being displayed in the lower left corner region 70A of the rear window 52B. Thus, the system controller 34A prompts the user to verify that the user wishes to replace the digital image 50 representing the user's family members with the digital image 50 including a logo of the football team. When the system controller 34A receives, via the HMI 60, confirmation that the user wishes to do so, the system controller 34A replaces the digital image 50 representing the user's family members with the digital image 50 including a logo of the football team.

Further, in another exemplary embodiment, when there is at least one digital image 50 currently being displayed, after displaying the selected digital image 50, the system controller 34A is further adapted to prompt the user to select any of the at least one digital images 50 currently being displayed to be removed, receive input, via the HMI 60, from the user selecting currently displayed digital images 50 to be removed, and removes selected currently displayed digital images 50 from the display 54.

For example, in addition to the digital image 50 including the user's family members, the system controller 34A is also displaying, in the right rear corner region 70B of the rear window 52B a different digital image 50 that the user does not wish to display at the football venue. Thus, after the system controller 34A replaces the digital image 50 of the members of the user's family with the digital image 50 of the logo of the football team within the lower left corner region 70A of the rear window 52B, the system controller 34A prompts the user to see if any other digital images 50 should be removed, wherein, the user can select, via the HMI 60, to remove the digital image 50 currently being displayed in the lower right corner region 70B of the rear window 52B.

In another exemplary embodiment, the system controller 34A is adapted to automatically detect expiration of identification or authorization credentials included in a digital image 50, such as a parking pass or state park entrance pass, and prompt the user to see if the user wishes to renew such credentials. For example, the system controller 34A determines that the vehicle 10 is driving toward a state park that is frequently visited by the user and thus predicts that the user will wish to display a digital image 50 of a state park entrance pass within the lower corner region 68 of the front windshield 52A of the vehicle 10 for entrance into the park. However, the system controller 34A also detects that the state park entrance pass credentials have expired and prompts the user, via the HMI 60, to inform the user that the state park entrance pass has expired and asks the user if the pass should be renewed. Upon verification by the user, the system controller 34A communicates, via the wireless communication module 36, with an online state park website 72 to digitally renew the user's state park entrance pass, and updates the digital image 50 displayed accordingly.

Figure 6:
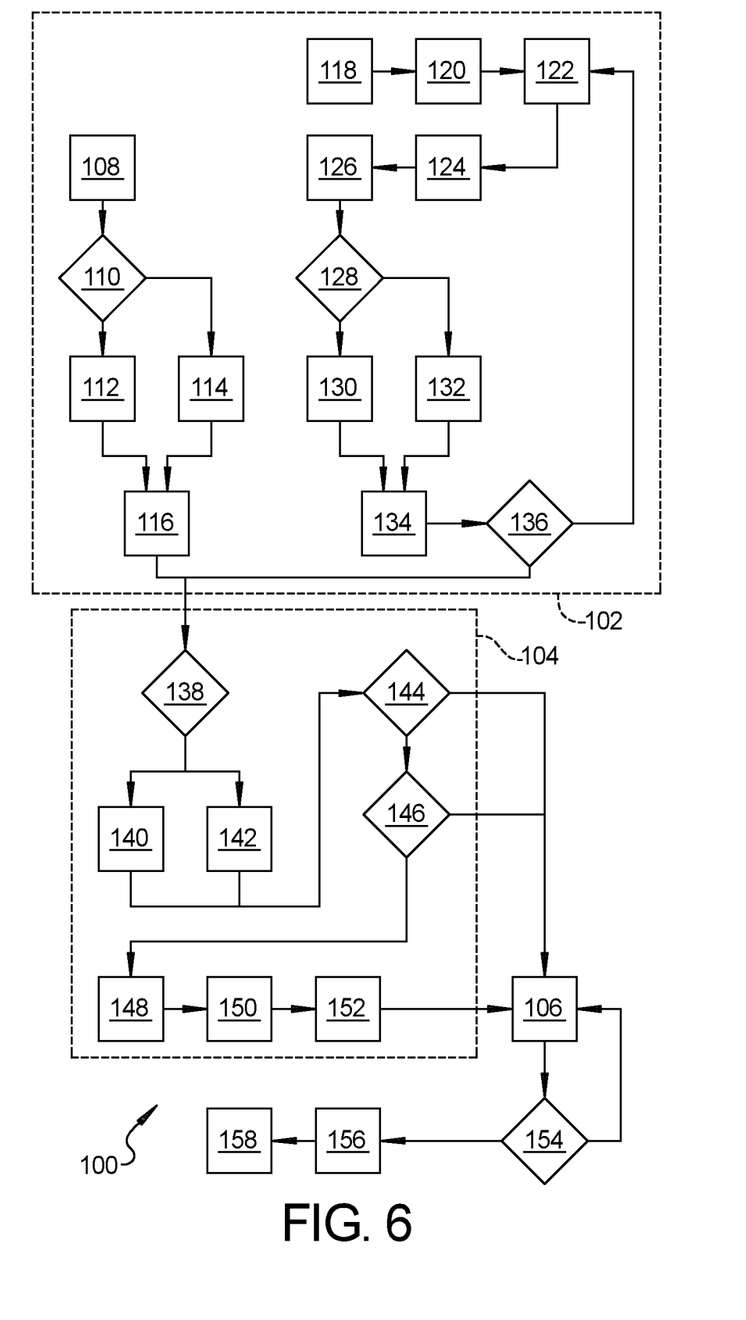
FIG. 6 is a flow chart illustrating a method according to an exemplary embodiment.

Referring to FIG. 8, a method 100 of displaying a digital window sticker within a vehicle 10 includes, beginning at block 102, selecting, with a system controller 34A, a digital image 50 to be displayed, moving to block 104, determining, with the system controller, a location for the selected digital image to be displayed, and, moving to block 106, displaying, with the system controller 34A, via a display 54 within the vehicle 10, the selected digital image 50.

In an exemplary embodiment, moving to block 108, the user desires to display a digital image, and the selecting, with the system controller 34A, the digital image 50 to be displayed at block 102 further includes one of, moving to block 110, if the desired digital image 50 is available within a personal library 56 of digital images available to the user, moving to block 112, selection of the digital image 50 from the personal library 56 of digital images available to the user, or, moving again to block 110, if the desired digital image 50 is not present within the personal library 56, moving to block 114, selection of the digital image 50 from available digital images obtainable from an application based online store 58. Moving to block 116, the system controller 34A receives from the user, via the HMI 60, selection of either the digital image 50 from the personal library 56, or from the online store 58.

In another exemplary embodiment, the selecting a digital image 50 to be displayed at block 102 further includes, moving to block 118, the user uploads and stores digital images into the personal library 56, moving to block 120, receiving, with the system controller 34A, via the HMI 60 in communication with the system controller 34A, user preferences related to when and where digital images 50 are displayed, moving to block 122, identifying, with an occupant monitoring system 62 in communication with the system controller 34A and facial recognition algorithms, the user within the vehicle 10, moving to block 124, receiving, with the system controller 34A, from the plurality of sensors 40a-40n within the vehicle 10 and in communication with the system controller 34A, contextual data related to the vehicle 10, and moving to block 126, selecting, with the system controller 34A, a digital image 50 to be displayed based on a machine learning model 64 in communication with a database 66 including data related to past occurrences of the system 11 displaying digital images 50, the identity of the user within the vehicle 10 and preferences received for the user, and real time contextual data for the vehicle 10 received from the plurality of sensors 40a-40n.

In an exemplary embodiment, the selecting, with the system controller 34A, the digital image 50 to be displayed at block 102 further includes, moving to block 128, searching, with the system controller 34A, the personal library 56 of digital images 50 available to the user, and if the desired digital image 50 is available within the personal library 56 of digital images available to the user, moving to block 130, prompting the user, via the HMI 60, with a suggested digital image 50 from the personal library 56 of digital images 50 available to the user, or, moving again to block 128, if the desired digital image 50 is not present within the personal library 56, moving to block 132, searching, with the system controller 34A, the application based online store 58, identifying a digital image 50 available for purchase through the application based online store 58, and prompting the user, via the HMI 60, with an option to purchase and display the identified digital image 50. Moving to block 134, the system controller 34A receives from the user, via the HMI 60, selection of either the digital image 50 from the personal library 56, or from the online store 58. Moving to block 136, if the user does not accept the suggested digital image 50 from the system controller 34A, the method 100 reverts back to block 122.

If the user selects a digital image 50 at block 116 or at block 136, moving to block 138, the determining, with the system controller 34A, a location for the selected digital image 50 to be displayed at block 104 further includes determining if the selected digital image 50 includes identification and/or authorization information, and, moving to block 140, when the selected digital image 50 includes identification and authorization information, selecting a location within a bottom corner region 68 of a front windshield 52A of the vehicle 10, and, moving to block 142, when the selected digital image 50 does not include identification and authorization information, selecting a location within a bottom corner region 70A, 70B of a rear window 52B of the vehicle 10.

In an exemplary embodiment, the displaying, with the system controller 34A, via the display 54 within the vehicle 10, the selected digital image 50 at block 106 further includes, when the selected digital image 50 includes identification and authorization information, displaying the selected digital image 50 within the bottom corner region 68 of the front windshield 52A of the vehicle 10, and, when the selected digital image 50 does not include identification and authorization information, displaying the selected digital image 50 within the bottom corner region 70A, 70B of the rear window 52B of the vehicle 10.

In another exemplary embodiment, the determining, with the system controller 34A, a location for the selected digital image 50 to be displayed at block 104 further includes, moving to block 144, determining, with the system controller 34A if at least one digital image 50 is already being displayed, and, if not, moving to block 106 wherein the selected digital image is displayed. If at block 144, at least one digital image is currently being displayed, moving to block 146, the system controller 34A prompts the user to verify that the user wishes to replace one of the at least one currently displayed digital images 50 with the selected digital image 50. If at block 146, the user elects not to replace the currently displayed digital image 50, then, moving to block 106, the selected digital image 50 is displayed along with the currently displayed digital image 50. If at block 146, the user elects to replace the currently displayed digital image, then, moving to block 148, the system controller 34A receives, via the HMI 60, confirmation that the user wishes to replace one of the at least one currently displayed digital images 50 with the selected digital image 50, and, moving to block 150, selection of one of the at least one currently displayed digital images 50 to be replaced by the selected digital image 50, wherein, moving to block 152, the currently displayed digital image which has been selected by the user to be replaced is removed, and moving to block 106, the selected digital image is displayed.

In an exemplary embodiment, the method further includes, after displaying the selected digital image 50 at block 106, when at least one digital image is currently being displayed, moving to block 154, prompting the user to select any of the at least one digital images currently being displayed to be removed, moving to block 156, receiving input, via the HMI 60, from the user selecting currently displayed digital images to be removed, and, moving to block 158, removing selected currently displayed digital images 50 from the display 54.

A system and method of the present disclosure offers the advantage of allowing a user to display digital images or digital window stickers that can be customized for or by the user and may be readily changed for different circumstances and users.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of displaying a digital window sticker within a vehicle, comprising:

receiving, with the system controller, from a plurality of sensors within the vehicle and in communication with the system controller, contextual data related to the vehicle;

receiving, with the system controller, via a human machine interface in communication with the system controller, user preferences related to when and where digital images are displayed;

identifying, with an occupant monitoring system in communication with the system controller and facial recognition algorithms, a user within the vehicle;

selecting, with the system controller, a digital image to be displayed based on:
  a machine learning model in communication with a database including data related to past occurrences of the system displaying digital images;
  the identity of the user within the vehicle and preferences received for the user; and
  real time contextual data for the vehicle received from the plurality of sensors;

determining, with the system controller, a location within a window surface of the vehicle for the selected digital image to be displayed; and displaying, with the system controller, via a display within the vehicle, the selected digital image from a window surface of the vehicle.

2. The method of claim 1, wherein the selecting, with a system controller, a digital image to be displayed further includes one of:
  selection of the digital image from a personal library of digital images available to a user; or
  selection of the digital image from available digital images obtainable from an application based online store.

3. The method of claim 2, wherein the selecting a digital image to be displayed further includes receiving, with the system controller, via a human machine interface (HMI) in communication with the system controller, selection, by a user within the vehicle, of a digital image to be displayed.

4. The method of claim 2, wherein the selecting, with the system controller, a digital image to be displayed further includes
  searching, with the system controller, the personal library of digital images available to the user, and prompting the user, via the HMI, with a suggested digital image from the personal library of digital images available to the user.

5. The method of claim 1, wherein the determining, with the system controller, a location for the selected digital image to be displayed further includes:
  when the selected digital image includes identification and authorization information, selecting a location within a bottom corner region of a front windshield of the vehicle; and
  when the selected digital image does not include identification and authorization information, selecting a location within at least one of:
    a bottom corner region of a rear window of the vehicle; and
    a region within any window surface of the vehicle selected by the user.

6. The method of claim 5, wherein the displaying, with the system controller, via a display within the vehicle, the selected digital image further includes:
  when the selected digital image includes identification and authorization information, displaying the selected digital image within a bottom corner region of a front windshield of the vehicle; and when the selected digital image does not include identification and authorization information, displaying the selected digital image within a bottom corner region of a rear window of the vehicle.

7. The method of claim 5, wherein the determining, with the system controller, a location for the selected digital image to be displayed further includes, when at least one digital image is currently being displayed:

prompting the user to verify that the user wishes to replace one of the at least one currently displayed digital images with the selected digital image;

receiving, via the HMI, confirmation that the user wishes to replace one of the at least one currently displayed digital images with the selected digital image, and selection of one of the at least one currently displayed digital images to be replaced by the selected digital image.

8. The method of claim 1 further including, when at least one digital image is currently being displayed and after displaying the selected digital image:

prompting the user to select any of the at least one digital images currently being displayed to be removed;

receiving input, via the HMI, from the user selecting currently displayed digital images to be removed;

removing selected currently displayed digital images from the display.

9. The method of claim 1, wherein the displaying, with the system controller, via the display within the vehicle, the selected digital image further includes displaying, with the system controller, the selected digital image on a display adapted to present the digital image outward from a window surface within the vehicle.

10. The method of claim 2, wherein the selecting, with the system controller, a digital image to be displayed further includes searching, with the system controller, the application based online store, identifying a digital image available for purchase through the application based online store, and prompting the user, via the HMI, with an option to purchase and display the identified digital image.

11. A system for displaying a digital window sticker within a vehicle, comprising:

a system controller adapted to:

select a digital image to be displayed;

receive, from a plurality of sensors within the vehicle and in communication with the system controller, contextual data related to the vehicle;

receive, via a human machine interface (HMI) in communication with the system controller, user preferences related to when and where digital images are displayed;

identify, with an occupant monitoring system in communication with the system controller and facial recognition algorithms, the user within the vehicle; and select a digital image to be displayed based on:

a machine learning model in communication with a database including data related to past occurrences of the system displaying digital images;

the identity of the user within the vehicle and preferences received for the user; and real time contextual data for the vehicle received from the plurality of sensors;

determine a location within a window surface of the vehicle for the selected digital image to be displayed; and display, via a display within the vehicle, the selected digital image from a window surface of the vehicle.

12. The system of claim 11, wherein the system controller is adapted to one of:

select the digital image from a personal library of digital images available to a user; or select the digital image from available digital images obtainable from an application based online store.

13. The system of claim 12, wherein when selecting a digital image to be displayed, the system controller is further adapted to receive, via a human machine interface (HMI) in communication with the system controller, selection, by the user within the vehicle, of a digital image to be displayed.

14. The system of claim 12, wherein when selecting a digital image to be displayed, the system controller is further adapted to:

search the personal library of digital images available to the user, and prompt the user, via the HMI, with a suggested digital image from the personal library of digital images available to the user.

15. The system of claim 11, wherein when determining a location for the selected digital image to be displayed, the system controller is further adapted to:

select a location within a bottom corner region of a front windshield of the vehicle when the selected digital image includes identification and authorization information; and select a location within a bottom corner region of a rear window of the vehicle when the selected digital image does not include identification and authorization information; and when displaying, via the display within the vehicle, the selected digital image, the system controller is further adapted to:

display the selected digital image within a bottom corner region of a front windshield of the vehicle when the selected digital image includes identification and authorization information; and display the selected digital image within a bottom corner region of a rear window of the vehicle when the selected digital image does not include identification and authorization information.

16. The system of claim 15, wherein when determining a location for the selected digital image to be displayed, the system controller is further adapted to, when at least one digital image is currently being displayed:

prompt the user to verify that the user wishes to replace one of the at least one currently displayed digital images with the selected digital image; and receive, via the HMI, confirmation that the user wishes to replace one of the at least one currently displayed digital images with the selected digital image, and selection of one of the at least one currently displayed digital images to be replaced by the selected digital image.

17. The system of claim 11 wherein, when at least one digital image is currently being displayed and after displaying the selected digital image, the system controller is further adapted to:

prompt the user to select any of the at least one digital images currently being displayed to be removed;

receive input, via the HMI, from the user selecting currently displayed digital images to be removed;

remove selected currently displayed digital images from the display.

18. The system of claim 11, wherein the display is adapted to present the selected digital image outward from a window surface within the vehicle.

19. The system of claim 12, wherein when selecting a digital image to be displayed, the system controller is further adapted to search the application based online store, identify a digital image available for purchase through the application based online store, and prompt the user, via the HMI, with an option to purchase and display the identified digital image.

20. A vehicle having a system for displaying a digital window sticker outward from a window surface within the vehicle, the system comprising:
   a system controller adapted to:
      select a digital image to be displayed from one of a personal library of digital images available to a user, and available digital images obtainable from an application based online store, wherein the digital image is selected based on one of;
         selection, received via a human machine interface, by the user; and
         selection, by the system controller, based on a machine learning model in communication with a database including data related to past occurrences of the system displaying digital images, the identity of the user within the vehicle and preferences received for the user, and real time contextual data for the vehicle;
      select a location for the selected digital image to be displayed within a bottom corner region of a front windshield of the vehicle when the selected digital image includes identification and authorization information;
      select a location for the selected digital image to be displayed within a bottom corner region of a rear window of the vehicle when the selected digital image does not include identification and authorization information;
      when at least one digital image is currently being displayed:
         prompt the user to verify that the user wishes to replace one of the at least one currently displayed digital images with the selected digital image; and
         receive, via the HMI, confirmation that the user wishes to replace one of the at least one currently displayed digital images with the selected digital image, and selection of one of the at least one currently displayed digital images to be replaced by the selected digital image;
      display, via a display within the vehicle, the selected digital image within a bottom corner region of a front windshield of the vehicle when the selected digital image includes identification and authorization information; and
      display, via the display within the vehicle, the selected digital image within a bottom corner region of a rear window of the vehicle when the selected digital image does not include identification and authorization information.

* * * * *